United States Patent [19]

Morris et al.

[11] Patent Number: 5,048,959
[45] Date of Patent: Sep. 17, 1991

[54] SPECTROGRAPHIC IMAGING SYSTEM

[75] Inventors: Michael D. Morris; Patrick J. Treado, both of Ann Arbor, Mich.

[73] Assignee: The Regents of the University of Michigan, Ann Arbor, Mich.

[21] Appl. No.: 531,871

[22] Filed: Jun. 1, 1990

[51] Int. Cl.$^5$ .......................... G01J 3/44; G01N 21/65
[52] U.S. Cl. .................................. 356/301; 356/310; 356/330
[58] Field of Search ....................... 356/301, 310, 330

[56] References Cited

U.S. PATENT DOCUMENTS

| 3,578,980 | 5/1969 | Decker, Jr. et al. | 250/237 |
| 3,720,469 | 1/1973 | Harwit . | |
| 4,615,619 | 10/1986 | Fateley | 356/310 |
| 4,750,834 | 6/1988 | Fateley | 356/346 |
| 4,799,795 | 1/1989 | Fateley | 356/310 |
| 4,856,897 | 8/1989 | Fateley et al. | 356/301 |

OTHER PUBLICATIONS

*A Hadamard Transform Raman Microprobe,* applied Spectroscopy, vol. 43, No. 2, 1989, Patrick J. Treado and Michael D. Morris.
*Hadamard Transform Raman Microscopy,* 1989, Microbeam Analysis, M. D. Morris and P. J. Treado.
*Multichannel Hadamard Transform Raman Microscopy,* Appl. Spectrosc, vol. 44, No. 2, 1989, Patrick J. Treado and Michael D. Morris.
*The Hadamard Transform,* Analytical Chemistry, vol. 61 1989, Patrick J. Treado & Michael D. Morris.
*Spectrochemical Analysis,* Prentice-Hall, Englewood Cliffs, Chapter 16, James D. Ingle, Jr. and Stanley R. Crouch.
*Hadamard Transform Raman Microscopy of Laser-Modified Graphite Electrodes* Apr. 23, 1990, P. J. Treado, Anurag Govil & M. Morris, Kent D. Sternitzke & Richard L. McCreery.

*Primary Examiner*—F. L. Evans
*Attorney, Agent, or Firm*—Harness, Dickey & Pierce

[57] ABSTRACT

An imaging system for providing spectrographically resolved images. The system incorporates a one-dimensional spatial encoding mask which enables an image to be projected onto a two-dimensional image detector after spectral dispersion of the image. The dimension of the image which is lost due to spectral dispersion on the two-dimensional detector is recovered through employing a reverse transform based on presenting a multiplicity of different spatial encoding patterns to the image. The system is especially adapted for detecting Raman scattering of monochromatic light transmitted through or reflected from physical samples. Preferably, spatial encoding is achieved through the use of Hadamard mask which selectively transmits or blocks portions of the image from the sample being evaluated.

7 Claims, 3 Drawing Sheets

SPECTROGRAPHIC IMAGING SYSTEM

This invention was made with government support under contract DE-FG02-89ER13996 awarded by DOE and contract R01-NS-26160 awarded by NIH. The government has certain rights and in the invention.

BACKGROUND AND SUMMARY OF THE INVENTION

This invention relates to a system for obtaining spectroscopically resolved images of materials, and particularly, for obtaining such images using spatial encoding with a two-dimensional image detector.

There are numerous instances in which spectroscopically resolved images from samples such as those observed under a microscope are desired. One such application is Raman spectroscopy. Raman spectroscopy is a technique which utilizes inelastic light scattering phenomena, which is commonly used to obtain vibrational spectra of a sample. A high intensity monochromatic beam impinges on the sample and a small fraction (about 1 in $10^7$) of the photons is scattered at (optical) frequencies which differ from the incident (optical) frequency by vibrational frequencies of the sample molecules. Most of this inelastic scattering occurs with loss of photon energy (red spectral shift) and it is this red-shifted scattered light which is usually collected as a Raman signal. Since the early 1960's lasers have been the preferred light source for Raman scattering. Many kinds of lasers have been employed. At present the most common ones are argon ion (457-514 nm), Nd-YAG (1.06 microns and 532 nm) and krypton ion (647 and 752 nm). There is increasing interest in the use of semiconductor diode lasers (780-800 nm) as Raman light sources.

Raman scattering vibrational spectral bands in solids are usually 5-20 $cm^{-1}$ wide. An instrument must be able to resolve these bands and to observe very faint signals. The low efficiency of Raman scattering means that the collected signal may be only a few photons per second, although it is more commonly on the orders of 100-10,000 photons per second.

Like infrared spectra, Raman spectra are sensitive to small changes in molecular structure and are, therefore, reasonably good "fingerprints" for a molecule. A microscope which generates images of Raman scattering would be expected to be useful in many areas of science and technology. Materials which are commonly examined by Raman scattering include, but are not limited to: minerals, superconductors, semiconductors, polymers of all kinds, and biological materials including bones and teeth. An imaging system capable of imaging on two or more frequencies simultaneously would be especially useful for mapping heterogeneous materials.

The system according to the present invention provides the ability to image on many frequencies simultaneously. In principle, with the present invention it is possible to image on every band which is resolved by a spectrometer and viewed by the two-dimensional detector used. In practice, most applications would require imaging on 1-10 bands, because most microscopic samples contain relatively few components.

Photography has been used for many years to make permanent records of images generated under light microscopes. Since about 1980 video cameras have been attached to microscopes to generate images which can be recorded on video tape, or digitized and stored in a computer. If spectroscopic resolution is needed, the common practice is to put a filter or filters in the system to isolate the desired wavelengths. Such filters, which are customarily constructed of colored glass or multilayer thin films (interference filters) isolate relatively broad bands, and are not suitable for Raman scattering or other high resolution techniques. Colored glass filters are further not tunable thus requiring a multitude of filters, one for each frequency band of interest. Interference filters are only tunable over a very limited range by rotating them perpendicular to the direction of propagation of light. Imaging at different wavelengths is accomplished by placement of different filters in the optical system. Filter systems are widely used in fluorescence microscopy and spectroscopically resolved visible light microscopy.

It is also possible to use interferometers as tunable filters in microscope imaging systems. Both Michelson interferometers and Fabry-Perot interferometers have been used for this purpose. Because infrared imaging detectors are unsatisfactory for infrared spectroscopy, the interferometer functions as a filter and point by point scanning is used to generate an image.

Although it is theoretically possible to use filters as a means of generating spectrally resolved images of Raman scattering, such systems would be generally unsatisfactory. Individual filters would be needed for each frequency and bandwidth desired. Also, it is often unknown which wavelengths are of interest in a sample without using a spectrograph to generate spectra for a sample. The present invention includes elements which enable the system to be used as a Raman point microprobe, enabling spectral characteristices of interest to be identified before attempting to generate a spectrally resolved image.

Raman spectra have been obtained under microscopes since about 1975. An early imaging device, called a MOLE (Molecular Optics Laser Examiner) was marketed for a few years. It was a low spectroscopic resolution system in which the entire magnified image was introduced into the spectrograph and viewed on a video monitor. The image was generated by a laser beam which was systematically scanned across the sample. The instrument was not very successful and has been withdrawn from the market. Point microprobes have been successful and have been continuously available since the middle 1970's. They are available from most or all of the major manufacturers of Raman spectrometers world wide.

The most common presently available Raman microscope imaging technique is to systematically move a sample on the stage of a microscope under a point-focused laser. This technique requires 30-90 minutes to generate an image, which is typically no finer than 100x100 pixels and has a spatial resolution determined by the laser focus, which is typically 1-3 microns. Similar techniques are used in infrared spectroscopy and require even longer times.

The system of the present invention utilizes means for illuminating a sample and collecting scattered light which is encoded and dispersed using a spectrometer. The dispersed image is projected onto a two-dimensional detector. Because it is intended for use with a video detector, one dimension of the detector is available for imaging the spatial dimension of the image which is parallel to the entrance slit of the spectrometer. Spatial image information perpendicular to the spectrometer entrance slit is obtained by using spatial encoding such as one-dimensional coded apertures (Hadamard masks). A sequence of encoded images are serially line-focused into the spectrograph which provides for efficient spectral resolution without loss of information in the spatial dimension parallel to the slit. From the sequences of spectroscopically resolved line images, two-dimensional spectroscopically resolved images can be recovered using a reverse transform function.

Hadamard multiplexing was developed for spectroscopy and imaging in the period of 1968 to 1975. In the spectroscopic application a series of Hadamard masks encodes the dispersed radiation at the exit plane of a spectrograph for recording on a single channel detector, which sums the signals from the various open apertures. The spectrum can be recovered from the sequence of encoded signals. In addition, the entrance slit of the spectrograph can be replaced by a series of coded apertures, thus increasing the through-put of the instrument. Hadamard imaging was developed during the same interval. In this application, the image is brought to a focus on a two-dimensional Hadamard mask system, which encoded spatial information for detection by a single channel detector. Occasionally, one-dimensional images only were obtained by this technique using one-dimensional encoding. The spatially resolved images could also be brought to a Hadamard spectrometer, although this technique did not prove practical.

It is also possible to encode the light source to generate spatially resolved images. This technique was proposed in the 1970's and has been used to obtain photoacoustic and photothermal images.

With suitable illumination, the system of the present invention can operate in any of several microscopy modes, including transmission, reflection, fluorescence and light scattering. The system is capable of acquiring images at multiple wavelengths simultaneously and is especially suitable for obtaining faint images with high spectroscopic resolution. For this reason the system of this invention is ideally suited in imaging materials for their Raman light scattering properties.

The system of this invention achieves an average analysis time advantage because it allows illumination with much higher laser intensity than is possible with conventional, point-focused, Raman microprobes. Consequently, stronger signals are generated, and these require shorter acquisition times. High illumination power can be used because the source illuminates the entire sample, thus decreasing the local light intensity incident on the sample, thereby minimizing the probability of sample thermal damage.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
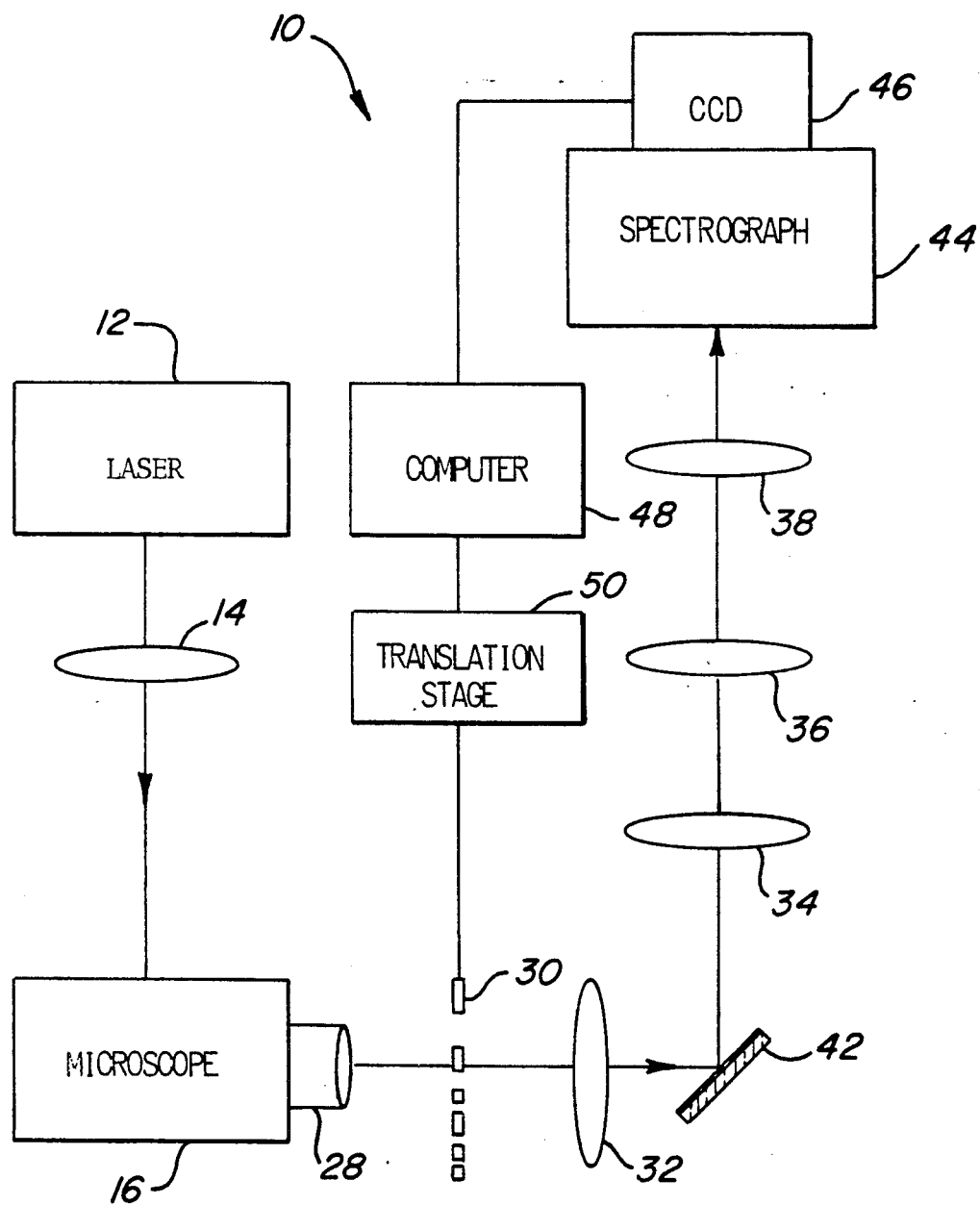
FIG. 1 is a pictorial view of a spectrographic imaging system in accordance with this invention.

The spectroscopic imaging system in accordance with this invention is shown in Figure in pictorial form and is generally designated there by reference number 10. Laser 12 is shown as a light source which illuminates the sample and can be one of numerous types of laser or other monochromatic light sources. As explained previously, lasers are useful light sources for Raman scattering sample evaluation. Light from laser 12 is de-focused by lens 14 so as to illuminate the entire sample 20 which is placed on the stage of microscope 16.

It will also be understood that the use of compound microscope 16 is not necessary in the practice of the present invention. Although the compound microscope is a predominant microscope configuration, the magnification provided by an objective lens alone may be sufficient for some applications. Moreover, this form of spectroscopic imaging does not require a microscope at all, since any image which can be brought to a focus at the plane of a spatial encoding mask as explained below can be spectroscopically resolved and re-assembled using the imagining technique of this invention. It will be appreciated that the means for illuminating the sample 20 may vary according to the nature of the microscopic technique to which the imaging system is applied. For Raman scattering, monochromatic laser radiation will be found appropriate. For fluorescence evaluations, an incoherent light source and a filter may provide the illumination; while for reflectance, a broad band (white light) incoherent source may prove most useful. Similarly, various means for distributing illuminating light across the sample may be employed. Lens, mirrors, optical fibers or other elements may be used to obtain an illumination beam whose intensity is as uniform as possible across the sample 20. The proper operation of the imaging system 10 does not require such constancy, but interpretation of the resulting images is easier if the light source has uniform intensity.

Figure 2:
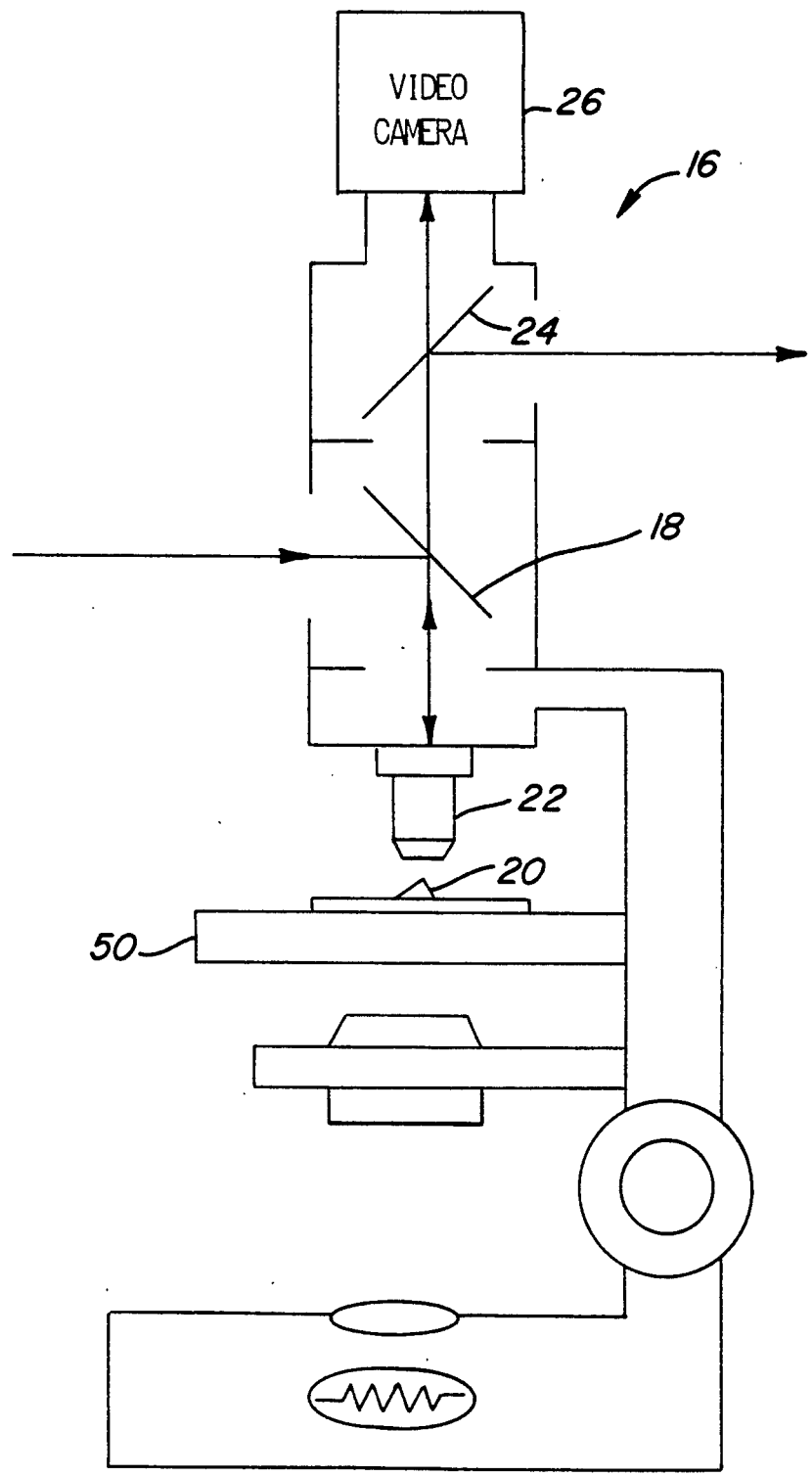
FIG. 2 is a pictorial view of the compound microscope elements taken from FIG. 1.

The individual components of microscope 16 are best described with reference to FIG. 2. As shown, the defocused laser beam is reflected using dichroic beam splitter 18. This incident light illuminates sample 20 through objective lens 22. The system floods the entire sample 20 with light that is defocussed thereby providing the advantage of avoiding localized heating of the sample. Reflected light which includes frequency shifted Raman scattering is directed back along the same optical path as the illumination light, but some of that light travels through beam splitter 18 where it strikes another beam splitter 24. The sample image can be observed using a conventional video camera 26 which facilitates proper framing and focussing of the sample. A fraction of the image light striking beam splitter 24 is reflected through eyepiece 28. Alternatively, beam splitter 24 may be replaced by a mirror or prism to direct all of the collected light through eyepiece 28.

It will also be understood that the imaging techniques which may be used with imaging system 10 is not limited to the use of vertical illumination, as described above and shown in the Figures. For example the imaging system may be employed with forms of transmission microscopy, etc.

In the embodiment shown, the magnified image from microscope 16 is brought into focus on a spatial encoding mask 30 using the projection eyepiece 28 integral to the microscope or such other optical elements as might prove convenient.

In the embodiment shown, spatial encoding is provided using a Hadamard mask, which is a form of "digital" or "square wave" encoding since it uses a mask which either transmits or completely blocks portions of the image. It would be possible to use other forms of spatial encoding in practicing the present invention. For example, graded density masks could be used including continuously variable light absorbing regions based on Fourier transform computations. It is believed, however, that the approach using a one-dimensional Hadamard mask provides practical and computational advantages.

Hadamard encoding mask 30 can take various forms. Mechanical implementations of such masks can be made of milled opaque materials such as a metal. A series of apertures could also be fabricated on a transparent substrate, for example metal coatings on glass, quartz or silicon. As explained in more detail below, it is necessary to present a series of discrete mask configurations during the evaluation process, the precise number of which is determined by the number of pixels desired in the final image. One means of accomplishing this is to use a mask which is framed to define an active area, and moving the mask within the frame to change the mask configurations framed. Optical shutter arrays (OSA's) could also be used as Hadamard mask systems. These systems comprise a matrix of electrically addressable, switchable elements which can be made transparent or opaque.

Figure 3:
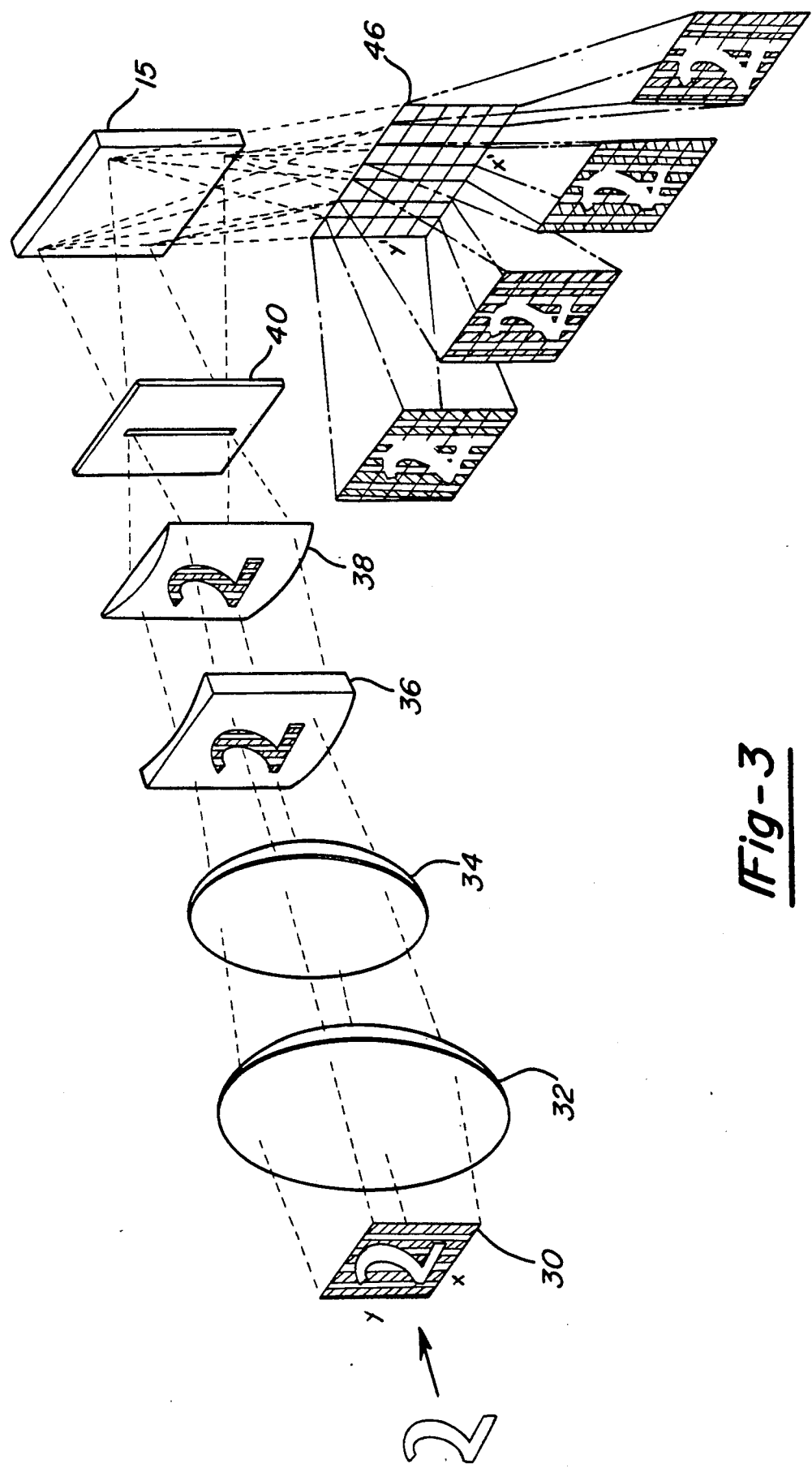
FIG. 3 is a pictorial view of the multi-channel Hadamard transform optics of this invention.

Lenses 32, 34, 36 and 38 are used in combination to focus the width direction the microscope image, identified in FIG. 3 as the x dimension, onto spectrograph entrance slit 40. Lens 32 functions as the collector lens whose f/number matches the f/number of the optical system defined by microscope eyepiece 28 and the Hadamard mask 30 active area, so as to maximize collection of the encoded image. Lens 34 with mirror 42 (omitted from FIG. 3 for clarity) focuses and projects the encoded image on the spectrograph image slit 40 and brings the y axis component to a focus at the entrance slit. Lens 34 is chosen to have the same or larger f/number as the spectrograph 44. Lens 34 is preferably chosen to generate flat field images and may comprise but is not limited to photographic camera lenses. It will be appreciated that with suitable spectrographs and detectors, this relay function achieved by lenses 32 and 34 may be accomplished with one compound lens system. It will also be appreciated that reflective optics (i.e. mirror systems) may also be used for this purpose.

Lenses 36 and 38 are cylinder lenses which form the x axis image compression system. Lens 36 collimates the image in the x-direction only, while lens 38 focuses the compressed image onto spectrograph entrance slit 40. For these purposes, it is convenient for lens 36 to be a negative focal length (concave) lens, and lens 38 to be a positive focal length (convex) lens. Lenses 36 and 38 do not affect x-direction imaging. By using collimating lens 36, both the x and y dimensions of the image can be brought to focus in the plane coinciding with the spectrograph entrance slit 40. The transfer optics which relay the encoded image to the spectrograph must preserve the information in the y-direction (parallel to slit 40) with minimal distortion, while simultaneously compressing the y-direction to the width of slit 40. Achromatic lenses will be convenient if imaging is to be over a wide spectral range, as in reflectance or florescence evaluation. For Raman scattering, single element lenses will often be satisfactory. Lenses 36 and 38 may also be replaced by mirror systems of equivalent function.

The compressed images formed by the relay optical train are spectroscopically resolved by spectrograph 44 for example, a Czerny-Turner device. The dispersed light is presented to the two-dimensional imagining detector 46 which is preferably a slow-scan charge-coupled device detector (CCD) operating at low temperatures (below $-1000°$ C.).

For an N-element mask system, a sequence of "N" images must be obtained to recover a complete spectroscopically resolved image. Any number of apertures may be used. It is convenient to use a number, N, of apertures such that $N=2^m-1$, where m is an integer. With such N, a generally known mathematical procedure (the fast Hadamard transform) can be used for computational recovery of the image. In practice, $N=255$ or $N=511$ will often be found adequate to define a number of pixels sufficient to create a visually satisfactory image. With standard microscope optics the inventors have found it convenient to use apertures 20-60 microns wide. It will be appreciated that the image of the illuminated object has been magnified by the microscope optics, and such dimensions will encode an object region sufficiently small that diffraction, lens aberrations or other properties of the microscope system limit the spatial resolution of the encoded image.

FIG. 3 illustrates the images which are produced by system 10 on detector 46 for a single exposure of mask 30. As shown each column of detector 46 is an image of the portions of the image which are transmitted through mask 30 of a given wavelength band after dispersion by diffraction grading 15. Through successive exposures, complete images at given frequencies may be recovered. In the illustration, the image is comprised of four frequency bands, and separate images for each band are presented along a column of the detector 46.

The procedure for recovering images of a desired wavelength band can be understood by reference to FIG. 3. Detector 46 is a square or rectangular array of small light sensitive regions. Spectrograph dispersion causes the light along each column along the horizontal detector axis $x'$ to be of the same wavelengths. The light at each element of the $x'$ column has come from a line from the x-axis of the image. The sequence of intensities recorded at each element, $y_i$, of the column $x'$ contains the encoded information for the line of elements $x'_0$, $y'_i$; $x'_1$, $y'_i$; ... $x'_n$, $y'_i$. Because each element of detector 46 has the property that the charge stored on it is directly proportional to the number of photons incident upon it, the detector elements perform an arithmetic sum of the light intensities from the open apertures at each exposure. By systematically varying the open and closed apertures defined by mask 30 on N successive exposures, enough information is obtained to recover the image.

It is convenient to use sequences called Hadamard sequences to define the open and closed apertures of mask 30. Such sequences are known to provide a useful technique for defining the apertures to be open and closed on each exposure. Computationally efficient methods for solving the set of linear equations which describe the summed intensities in terms of the positions of the open apertures are known and are called Hadamard transforms. If N has been chosen to be $2^m-1$, where m is an integer, an especially efficient fast Hadamard transform can be used. The Hadamard transform procedure is repeated for each element in the column of detector 46, thus generating a complete two-dimensional map. These computations are carried out by computer 48, which also controls the position of mask 30 through translation stage 50. The resulting image may be displayed on a computer monitor, video monitor, plotter, or other device, as convenient.

It will be appreciated that the same image generation procedure can be repeated at other wavelengths or wavelength bands, since the detector records information from each of many wavelengths along its x'-axis. In this manner, spectroscopically resolved images can be recovered at each of the wavelengths incident on the detector.

It will often be convenient to bin (electronically coadd) several pixels of detector 46 in the horizontal direction. It will often be observed that the spectroscopic resolution of the detector is greater than needed, so that combining information from several columns of pixels can be used to generate stronger signals without a significant loss of information. Similarly, if the full number of available vertical pixels is not needed, two or more of these can be binned to generate stronger signals.

While the above description constitutes the preferred embodiments of the present invention, it will be appreciated that the invention is susceptible to modification, variation and change without departing from the proper scope and fair meaning of the accompanying claims.

We claim:

1. A system for generating spectrographically resolved images comprising:
    means for providing an image for analysis defining x and y orthogonal axes,
    spatial encoding means defining encoding patterns for blocking portions of said image, said encoding means generating a multiplicity of different encoding patterns of predetermined configuration,
    optical means for defining a compressed line image in which said x axis direction of said image is compressed after portions thereof have been blocked by said encoding means while preserving said y axis direction of said image,
    spectrograph means for spectrally dispersing said compressed image wherein said spectral dispersion occurs along an axis perpendicular to the y direction of said compressed line image,
    two-dimensional image sensor means for detecting said dispersed image, and
    data storage and processing means for recording said encoding pattern of said encoding means and the corresponding output of said image sensor for a multiplicity of said different patterns and synthesizing spectrally resolved images at desired wavelengths.

2. A system for generating spectrographically resolved images according to claim 1 wherein said means for providing an image comprises a monochromatic light source and said system detects Raman scattering of said light source by a sample.

3. A system for generating spectrographically resolved images according to claim 1 wherein said means for providing an image comprises an optical microscope.

4. A system for generating spectrographically resolved images according to claim 1 wherein said optical means comprises at least one cylindrical collimating lens and at least one cylindrical focusing lens.

5. A system for generating spectrographically resolved images according to claim 4 wherein said cylindrically collimating lens and said cylindrical focusing lens provide a focus for said x and y directions of said line image at a plane at an entrance slit of said spectrograph means.

6. A system for generating spectrographically resolved images according to claim 1 wherein said encoding means comprises a Hadamard mask.

7. A system for generating spectrographically resolved images according to claim 1 wherein said encoding means comprises one-dimensional encoding wherein portions of said image are blocked along said y axis at selected positions along said x axis.

* * * * *